United States Patent [19]

Platt

[11] Patent Number: 5,720,453
[45] Date of Patent: Feb. 24, 1998

[54] FLUID FLOW CONTROL DEVICES AND METHODS

[75] Inventor: John T. Platt, Thornton-Cleveleys, United Kingdom

[73] Assignee: British Aerospace PLC, London, United Kingdom

[21] Appl. No.: 199,926

[22] Filed: May 9, 1988

[30] Foreign Application Priority Data

May 8, 1987 [GB] United Kingdom ............... 8710933

[51] Int. Cl.$^6$ .................... B64C 29/00; B64B 1/36
[52] U.S. Cl. .................. 244/23 D; 60/230; 239/265.19; 244/12.5; 244/52
[58] Field of Search ..................... 244/23 D, 52, 244/12.5; 60/230; 239/265.19

[56] References Cited

U.S. PATENT DOCUMENTS 4,456,203  6/1984  Louthan ........................... 244/23 D

FOREIGN PATENT DOCUMENTS 0126608  11/1984  European Pat. Off. .
952540   3/1964   United Kingdom .

*Primary Examiner*—Charles T. Jordan
*Attorney, Agent, or Firm*—Cushman, Darby & Cushman IP Group of Pillsbury, Madison & Sutro LLP

[57] ABSTRACT

A VSTOL aircraft powerplant comprises a gas turbine engine (1), a chamber (2) for receiving exhaust from the turbine section of the engine (1), and a jet propulsion nozzle (3) and vertical lift nozzles (4, 5) connected to the chamber (2). Blocker doors (6, 7) are provided for blocking flow of exhaust from the chamber (2) and thus diverting the flow to the vertical lift nozzles (4, 5). A high pressure air curtain is provided by ducts (9) to control th area of the ports to the vertical lift nozzles (4, 5). Control means coordinate and control the operation of the blocker doors (6, 7) and the air curtain to vary the total efflux between three configurations, namely all efflux occurring through the jet propulsion nozzle (3) for wing-borne flight; all efflux occurring through the vertical lift nozzle (4, 5) for hovering; and some efflux, which is steplessly variable, occurring through both the vertical lift nozzles and the jet propulsion nozzle for transition between wing-borne and jet-borne flight.

8 Claims, 3 Drawing Sheets

FLUID FLOW CONTROL DEVICES AND METHODS

This invention relates to fluid flow control devices and methods for use in particular, but not exclusively, in relation to aircraft engines for very short take-off and landing (VSTOL) aircraft.

One proposal for such an aircraft engine uses a mixed flow cycle and has in addition to a conventional forward propulsive jet pipe two or more jet pipes arranged in the underside of the aircraft to direct the jets downwardly and to produce vertical thrust and lift for the aircraft during take-off, landing and hovering manoeuvres. These pipes are positioned aft of the rear turbine. Unlike vectored thrust aircraft, which have rotating nozzles to direct the flow of exhaust gases in a chosen direction, the jet pipes in the mixed cycle powered VSTOL aircraft are fixed in one particular orientation and do not swivel. The jet efflux is switched through the appropriate pipes by mechanical shutters or doors for forward wing-borne or vertical jetborne flight. Proposed switching arrangements comprise butterfly valves in the vertical jet pipes operated in synchronism with blocker doors in the horizontal jet pipes. These butterfly valves must provide a fine control of the thrust and are prone to damage because of the extreme localised heating due to the presence of the jet efflux.

It is an object of the present invention to provide a fluid flow control device and a method of fluid flow control which at least partially eliminates the need for butterfly valves in the vertical jet pipes, thus overcoming the problem of localised heating and image due to the hot jet efflux.

It is a further object of the invention to provide fluid flow control devices and methods which do not rely on mechanically operated valves to effect changes in direction and/or rate of flow of a fluid through a port in a pipe.

According to the present invention in one aspect thereof there is provided fluid flow control means comprising a chamber through which a primary fluid from a primary source may flow, said chamber having an inlet port and at least two primary outlet ports, and flow control means for diverting fluid flow through different ones of said outlet ports comprising at least one control duct having at least one control outlet adjacent one of said primary outlet ports so that secondary fluid from a secondary source may be passed through said at least one control duct and control outlet to produce a barrier layer of secondary fluid between the flow of primary fluid and said adjacent primary outlet port and to prevent efflux of the primary fluid therefrom.

One of said at least two primary outlet ports may be a forward propulsive thrust nozzle of a gas turbine engine and another of said at least two primary outlet ports may then be a vertical lift nozzle of the gas turbine engine. In this case the at least one control outlet is located in the chamber adjacent and generally upstream of said vertical lift nozzle. The axis of said at least one control duct may then be parallel with the main axis of the engine and provide communication between a source of high pressure air, for example, an outlet from the engine compressor and the chamber. The control duct may be provided with an air flow control valve and the forward propulsive thrust nozzle may be provided with hinged blocker doors. Control means may then be provided to automatically open said air flow control valve whenever said blocker doors are opened and vice versa. Alternatively and additionally, the vertical lift nozzle may also be provided with a mechanical fluid flow control valve and the control means may then be arranged to close said air flow control valve whenever said blocker doors are opened and said mechanical control valve is closed and to open said air and said mechanical control valves wherever said blocker doors are closed.

According to another aspect of the present invention, there is provided a VSTOL aircraft powerplant comprising a gas turbine engine, a chamber for receiving exhaust from the turbine section of said engine, jet propulsion nozzle means connected to said chamber, vertical lift nozzle means connected to said chamber, blocker means for blocking flow of exhaust from said chamber to said jet propulsion nozzle means, air curtain forming means for selectably forming an air curtain barrier between said chamber and said vertical lift nozzle means, and control means for coordinating and controlling the operation of said blocker means and of said air curtain forming means to vary the outflow between three configurations, namely all outflow occurring through said jet propulsion nozzle means and none occurring through said vertical lift nozzle means; all outflow occurring through said vertical lift nozzle means and none through said vertical lift nozzle means; and some outflow occurring through both said vertical lift nozzle means and said jet propulsion nozzle means.

According to the invention in yet another aspect thereof a method of controlling the flow of primary fluid through an orifice includes the step of providing a fluid barrier of controlled strength formed of a secondary fluid injected substantially perpendicular to an axis of said orifice adjacent an inlet thereof.

Specific embodiments of the invention will now be described by way of example only and with reference to the following drawings, in which.

Figure 1:
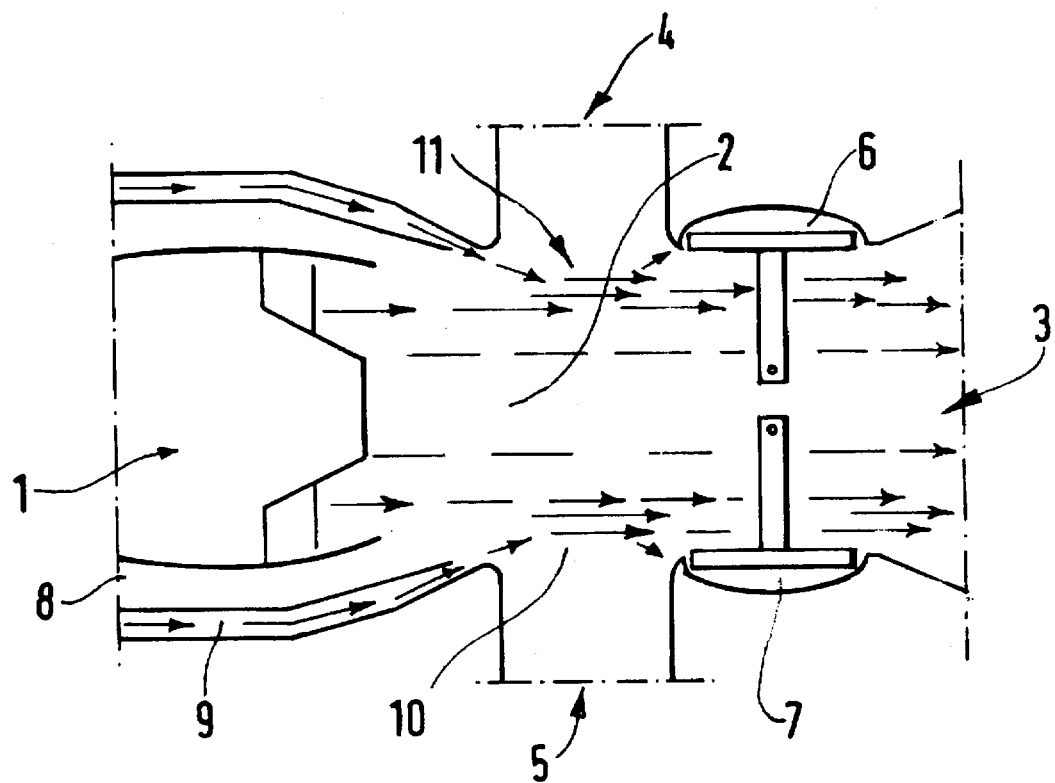
FIGS. 1 to 3 are schematic plan views of part of a VSTOL aircraft engine configured in forward, intermediate and vertical thrust positions respectively.

Referring to the Figures a VSTOL aircraft engine includes a turbine 1 downstream of which is a chamber 2 with a forward propulsion nozzle 3 and side expansion ports 4 and 5, two blocker doors 6 and 7 are associated wth the forward propulsion nozzle 3. A bypass duct 8 coaxially surrounds the turbine 1 and is in turn coaxially surrounded by a plurality, here for example twelve, high pressure bleed ducts 9. It will be appreciated that the engine includes many other components, e.g. a fan, compressor, combustion chamber forward of the turbine 1 and a propulsion nozzle with re-heat aft of said turbine. These have been omitted as they are inessential to an understanding of the invention.

FIG. 1 shows the engine in its forward thrust configuration in which the doors 6 and 7 are open to allow jet efflux to exit through a forward propulsion nozzle 3 to propel the aircraft forward. During forward flight side ports 4 and 5 are blocked off to the flow of exhaust by a barrier layer of high pressure cold dense air which is generated in regions 10 and 11 over the mouths of the ports 4, 5. The dense air forms a slightly convex boundary over the mouth of each port and prevents the hot exhaust gases from the turbine from escaping through the ports 4 and 5. In previously proposed arrangements the ports 4 and 5 are sealed solely by means of butterfly valves which would be prone to damage at least during deployment. The cold dense barrier air is supplied at high pressure through ducts 9, six ducts controlling each of the ports 4 and 5. The air is bled off e.g. from the engine compressor or fan. The pressurised air is delivered at a pressure which will be significantly higher than the pressure in the chamber 2.

During vertical take-off and landing, the doors 6 and 7 are closed to seal the forward propulsion nozzle 3 and the supply of cold air is shut off in the ducts 9 to remove, or reduce the strength of, the barrier layer and allow efflux to pass through the side ports 4 and 5.

Figure 2:
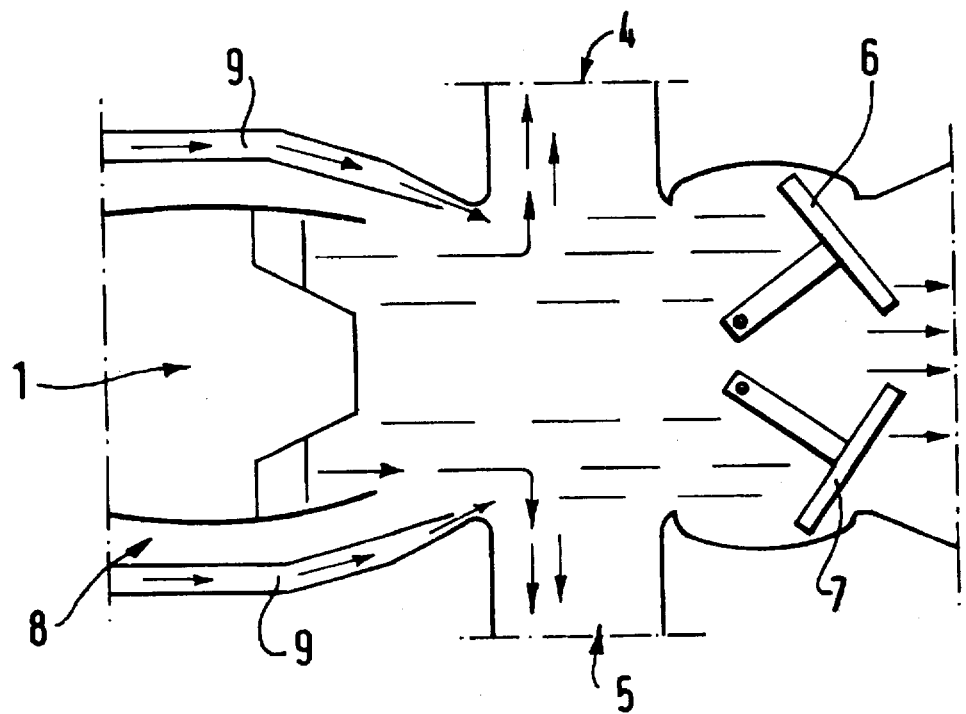

FIG. 2 shows the system in an intermediate configuration. The doors 6 and 7 are partially closed and the cold air from ducts 9 is only partially shut off so that some efflux is still able to pass through the doors 6, 7 to provide forward movement of the aircraft and some of the exhaust is able to penetrate the weak barrier layer to emerge from the side ports 4 and 5.

Figure 3:
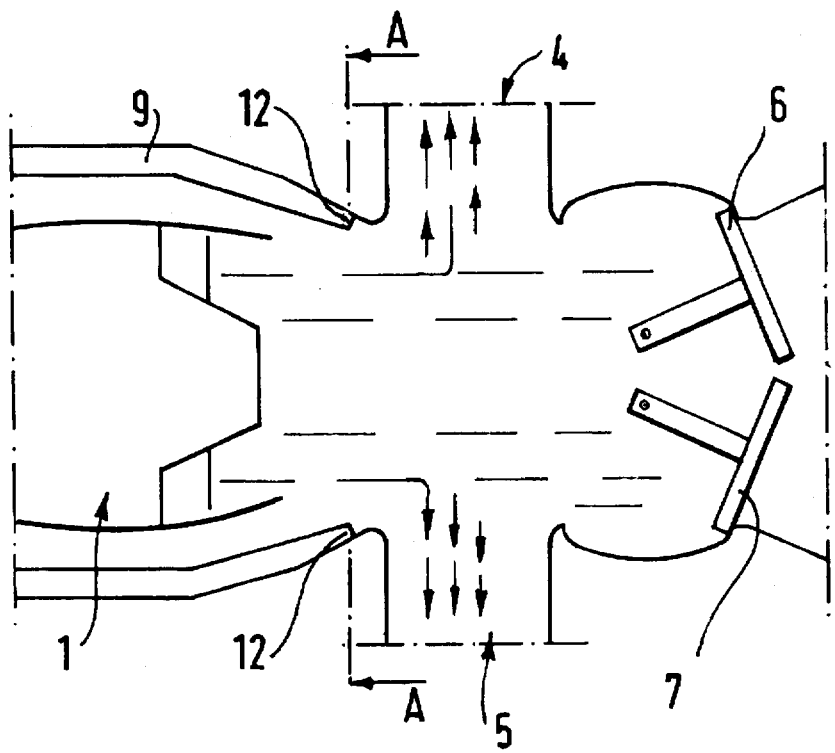

FIG. 3 shows the system in its full engine-borne (wing-borne) configuration. The doors 6 and 7 are closed completely to seal the nozzle 3 and the barrier layer produced by the ducts 9 has been completely shut off and is no longer present in regions 10 and 11. In this condition all of the efflux produced by the turbine 1 is diverted through the side ports 4 and 5 by a back pressure in the chamber 2 which is caused by closure of the doors 6 and 7.

Figure 4:
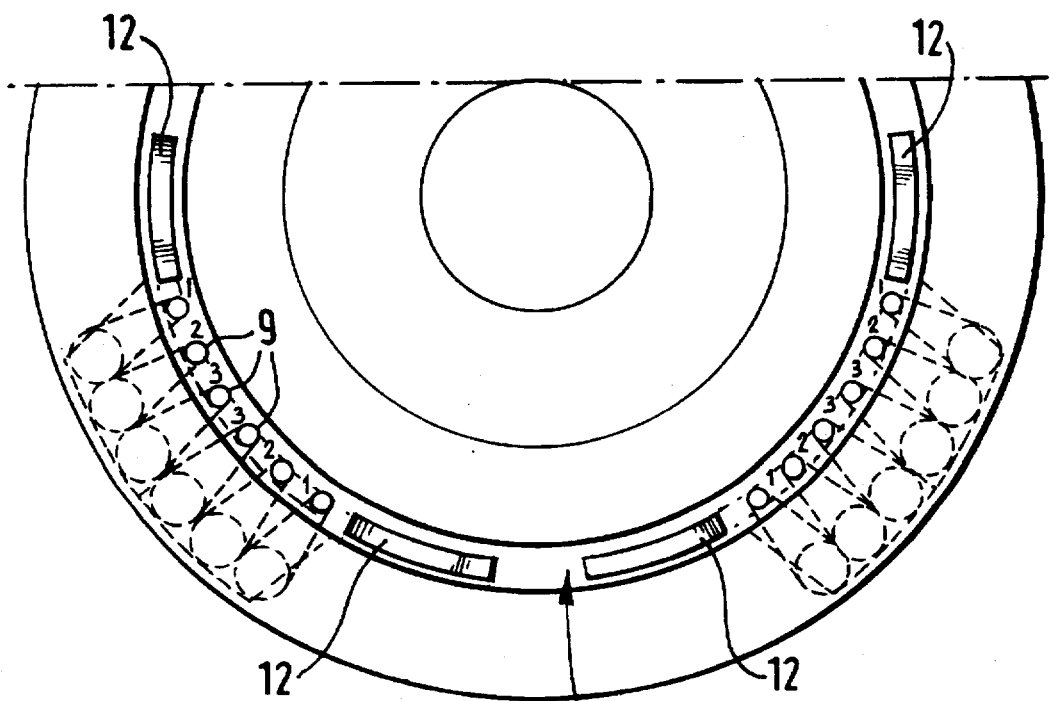
FIG. 4 is a schematic sectional view of the engine of FIG. 3 along the plane represented by the line A—A.

FIG. 4 shows the mechanism used for shutting off the supply of air from the barrier layer. Shutters 12 are slidably mounted in front of the supply ducts 9 and moved in front of the ducts 9 to block off the flow of air from the ducts. The ducts 9 are arranged in two sets of six; one set for each of the side ports 4 and 5. Each set is in turn divided into two groups of three ducts 9. Each group of three ducts has its own shutter 12 thus allowing the efflux through each side port 4, 5 to be independently controlled by independent control of the barrier layer. For symmetrical control of the ports 4 and 5 the shutters 12 are arranged by non-illustrated means move in opposite directions in synchronism and block off the ducts 9 either one at a time or in groups of three.

The sectional view of FIG. 4 shows the high pressure ducts 9 and shutters 12 to be arranged in a semi-circle around the inside of the engine along the cowl and concentric with the turbine axis. The ports 4 and 5 are angled with respect to the plane of symmetry of the aircraft and provide a component of vertical thrust from each side of the engine axis.

Figure 5:
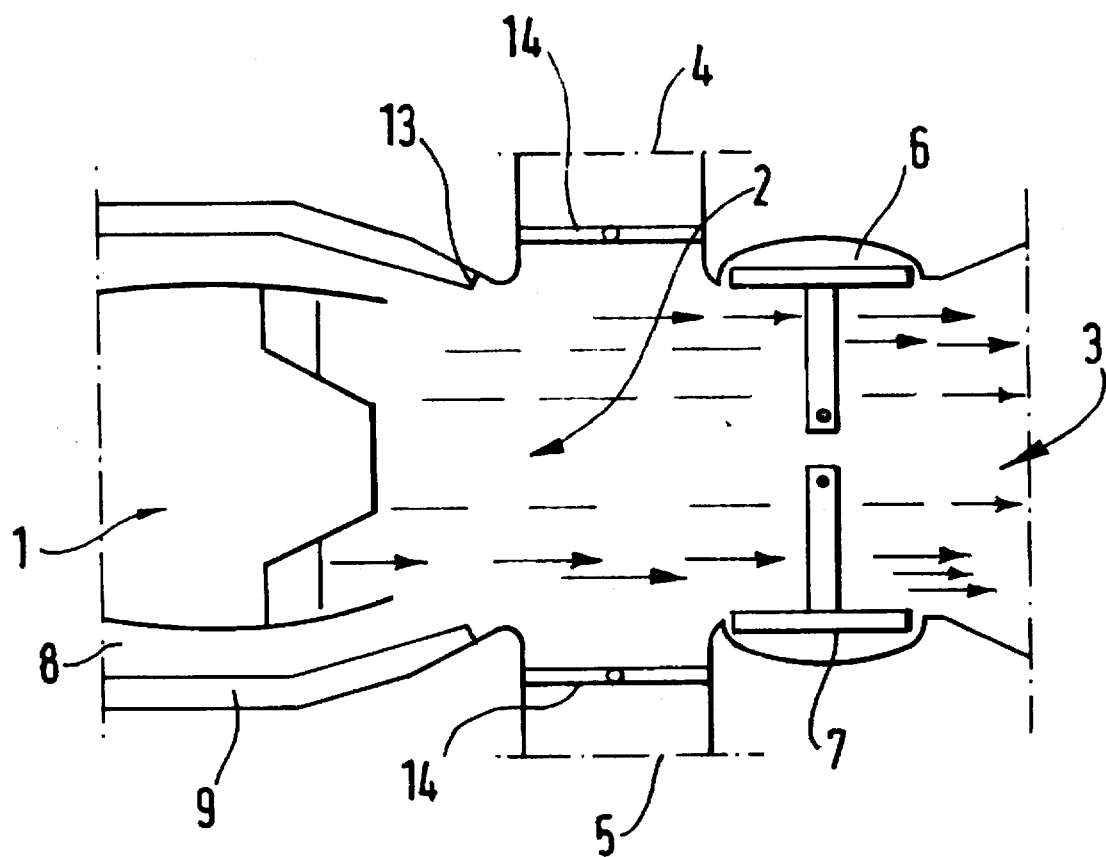
FIG. 5 is a schematic plan view of an alternative form of the engine of FIGS. 1 to 4.

In order to avoid providing the barrier layer continuously during conventional flight, the air curtain arrangement described above could be supplemented by known mechanical valve systems. Such a 'hybrid' embodiment is shown in FIG. 5, wherein a barrier layer of cold air is used in conjunction with previously proposed butterfly or other mechanical, e.g. slider, valves 14. The barrier layer of cold air is then used to seal the ports 4, 5 only during transition from forward wing-borne flight to jet-borne flight and to cool and protect the mechanical valves as they open or close.

During forward flight the mechanical valves 14 are closed to seal the ports 4 and 5. The cold dense air is shut off from the high pressure ducts 9. The butterfly valve surfaces will be contiguous with the engine lining and, if made of similar materials, will not suffer unduly from the heat of the engine exhaust. In this configuration the blocker doors 6 and 7 are open.

During the transition from forward flight to hovering flight the sealing of ports 4 and 5 is effected by cold dense air from the ducts 9 which are sequentially opened by the shutters 12 with the valves 14 fully open. In addition the cold air then reduces heating of the valves 14 by the hot engine exhaust. The blocker doors 6 and 7 begin to close during this transition phase.

In fully jet-borne flight the blocker doors 6 and 7 are shut, the high pressure air ducts 9 are closed again by the shutters 12 and the valves 14 are fully open. In this position the engine exhaust is directed downward through the ports 4 and 5. An advantage of the present arrangement in hybrid or non-hybrid form is that discrete control of the barrier layer may be achieved by shutting or opening any number of ducts in a given sequence. Although the arrangements described above the ducts 9 are switched on and off in a particular sequence schematically indicated by the numbers 1, 2 and 3, other arrangements of shutters could be devised to achieve a different sequence of opening and closing of the ducts 9.

Other arrangements are possible without departing from the scope of the invention; for example, the engine need not be limited to having two vertical thrust ports but could have only one or any other number and orientated at any angle and each port could be controlled at least in part by high pressure fluid flow control ducts.

It will also be appreciated that whilst described with particular application to controlling the thrust of a VSTOL aircraft the invention could be applied to any other industrial fields in which it is desired to control the rate of flow of fluid through an orifice.

I claim:

1. Fluid flow control apparatus comprising a chamber through which a primary fluid from a primary fluid source may flow said chamber having an inlet and at least two primary outlet ports, and control means for selectably diverting fluid flow through different ones of said outlet ports, said control means including at least one control duct connectible to a secondary fluid source to receive secondary fluid therefrom and having at least one control outlet disposed adjacently to one of said primary outlet ports so that outflow of secondary fluid from said at least one control outlet produces a barrier layer of secondary fluid between the flow of primary fluid and said adjacent primary outlet port to prevent efflux of the primary fluid therefrom, and variable obturation means for selectably varying at least one of the group of secondary fluid flow parameters comprising flow rate and pressure such that the efflux of the primary fluid via a given one of said primary outlet ports is variable from zero through any desired intermediate value to the whole of said efflux.

2. A VSTOL aircraft powerplant comprising a gas turbine engine, a chamber for receiving exhaust from the turbine section of said engine, jet propulsion nozzle means connected to said chamber, vertical lift nozzle means connected to said chamber, blocker means for blocking flow of exhaust from said chamber to said jet propulsion nozzle means, air curtain forming means for selectably forming an air curtain barrier between said chamber and said vertical lift nozzle means, and control means for coordinating and controlling the operation of said blocker means and of said air curtain forming means to vary the outflow between three configurations, namely all outflow occurring through said jet propulsion nozzle means and none occurring through said vertical lift nozzle means; all outflow occurring through said vertical lift nozzle means and none through said vertical lift nozzle means; and some outflow occurring through both said vertical lift nozzle means and said jet propulsion nozzle means.

3. A powerplant according to claim 2, wherein said control means is effective to vary the said outflow continuously between the said three configurations.

4. A powerplant according to claim 3, wherein said air curtain forming means includes a plurality of jets of air of variable intensity of flow and pressure.

5. A powerplant according to claim 4, wherein shutter means are associated with said jets or with groups of said jets.

6. A powerplant according to claim 4, wherein the outlet of each said jet is directed at an acute angle to the axis of jet propulsion flow, and is located upstream of said vertical lift nozzle means.

7. A powerplant according to claim 2, wherein said blocker means are articulated doors.

8. A powerplant according to claim 2, wherein said vertical lift nozzle means are provided, in addition to said air curtain forming means, with mechanical valve means; said control means being effective to open said air curtain forming means and said mechanical valve means whenever said blocker means blocks said jet propulsion nozzle means, and to close said air curtain forming means and said mechanical valve means whenever said blocker means permits efflux to pass through said jet propulsion nozzle means.

\* \* \* \* \*